United States Patent [19]

Omata

[11] Patent Number: 4,637,765
[45] Date of Patent: Jan. 20, 1987

[54] TWO-PIECE EXPANDABLE PLASTIC RIVET

[75] Inventor: Nobuaki Omata, Yokohama, Japan

[73] Assignee: Nifco Inc., Yokohama, Japan

[21] Appl. No.: 755,032

[22] Filed: Jul. 15, 1985

[30] Foreign Application Priority Data

Jul. 18, 1984 [JP] Japan ............................ 59-107638[U]

[51] Int. Cl.$^4$ ......................... F16B 13/04; F16B 13/06
[52] U.S. Cl. ......................................... 411/41; 411/42; 411/45; 411/57
[58] Field of Search .................... 411/40, 41, 42, 44, 411/45, 56, 57, 60, 21, 340, 345, 78, 79, 76

[56] References Cited

U.S. PATENT DOCUMENTS

| | | | |
|---|---|---|---|
| 2,287,395 | 6/1942 | Reynolds | 411/23 |
| 2,542,144 | 2/1951 | Kearns | 411/41 |
| 3,074,134 | 1/1963 | Buechler | 411/45 |
| 3,797,755 | 3/1974 | Saisho | 411/45 |
| 3,918,130 | 11/1975 | Poe | 411/41 |
| 4,375,342 | 3/1983 | Wollar et al. | 411/41 |
| 4,405,272 | 9/1983 | Wollar | 411/41 |
| 4,411,570 | 10/1983 | Juric | 411/44 |
| 4,566,832 | 1/1986 | Mirsberger et al. | 411/21 |

FOREIGN PATENT DOCUMENTS

| | | | |
|---|---|---|---|
| 2926940 | 1/1981 | Fed. Rep. of Germany | 411/501 |
| 629805 | 12/1961 | Italy | 411/60 |
| 47-43395 | 11/1972 | Japan | 411/44 |
| 48-13144 | 4/1973 | Japan | 411/45 |
| 457981 | 8/1968 | Switzerland | 411/21 |
| 857371 | 12/1960 | United Kingdom | 411/60 |

Primary Examiner—Gary L. Smith
Assistant Examiner—Carl M. DeFranco, Jr.
Attorney, Agent, or Firm—Trexler, Bushnell & Wolters, Ltd.

[57] ABSTRACT

A plastic rivet consisting of rivet body comprised of a flanged head and a leg member extending from the bottom of the head, the rivet body having an axial hole extending through its entire length, and a pin which when inserted into the through-hole, expands the leg member. The leg member of the rivet body is provided with a movable leg which is deflected outward when the pin is inserted into the through-hole of the rivet body so as, for example, to catch and hold a pair of plates through which the rivet body has been passed between the head of the rivet body and the deflected movable leg. Pushing the pin further into the rivet body causes the deflected movable leg to return to its normal position, whereby the fastening action of the rivet is released.

4 Claims, 10 Drawing Figures

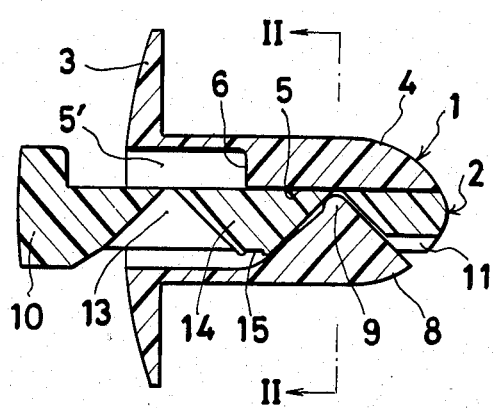
FIG_1
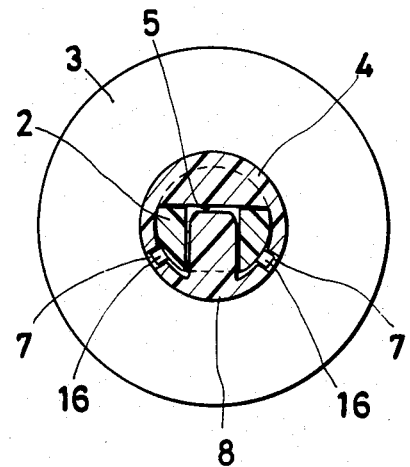
FIG_2
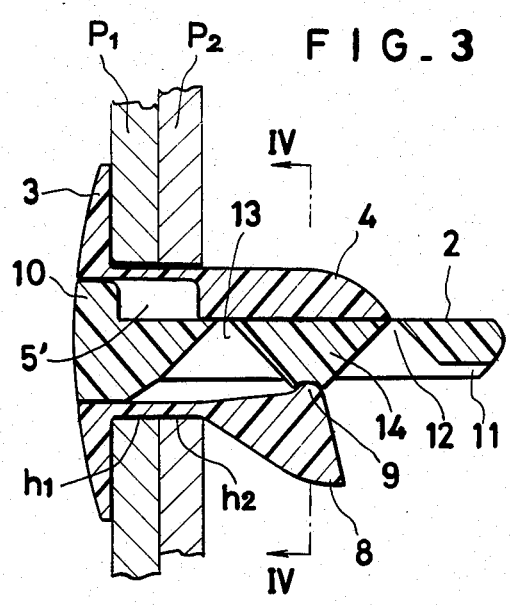
FIG_3
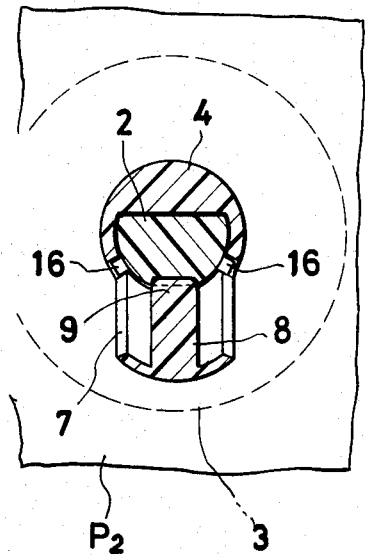
FIG_4

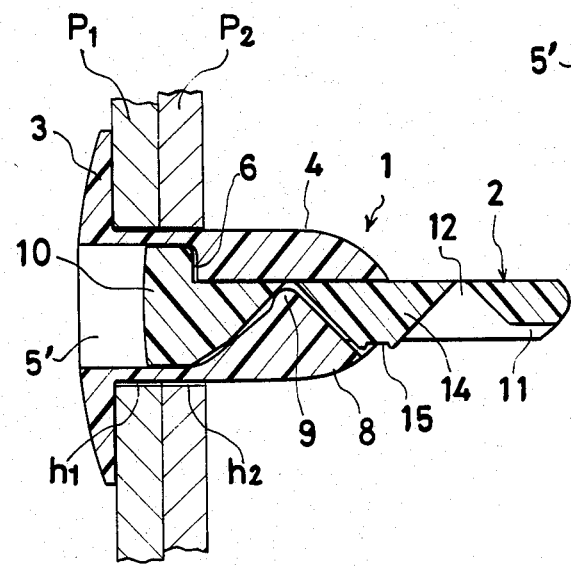
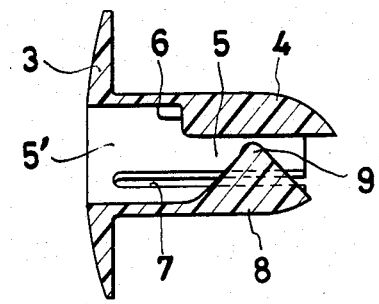
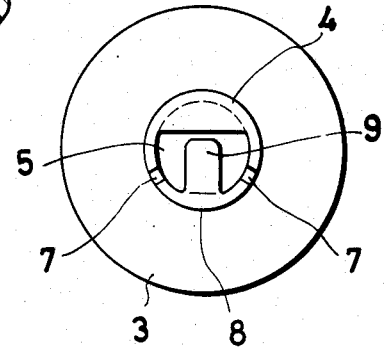
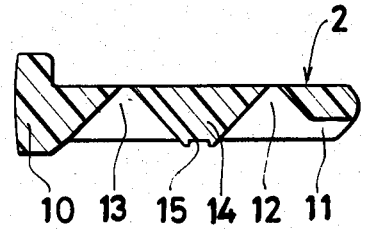
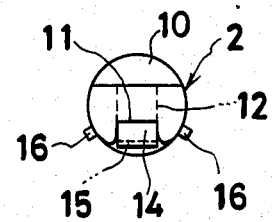
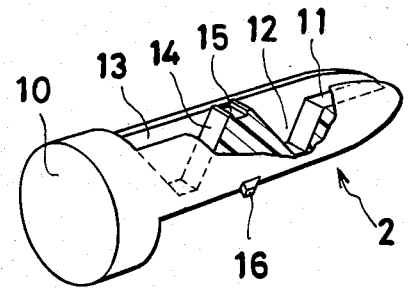

TWO-PIECE EXPANDABLE PLASTIC RIVET

BACKGROUND OF THE INVENTION

1. Field of the Invention

The present invention relates to a plastic rivet consisting of a rivet body comprised of a flanged head and a leg member extending from the bottom of the head, and a pin which when inserted into an axial through-hole of the rivet expands the leg member.

2. Description of the Prior Art

Because of their convenience as fasteners for components requiring periodic inspection and maintenance, rivets of the type which can be fastened and unfastened by insertion and extraction of a pin into and from a rivet body are coming into increasingly wide use. The conventional rivet of this type has, however, not been entirely satisfactory. One problem has been that since the structure employed makes it difficult to obtain adequate expansion of the leg member by insertion of the pin it has been necessary to make the diameter of the axial through-hole close to the outer diameter of the leg member. As a result, a high degree of processing precision is required in forming the rivet body and, worse, the rivet is often unable to provide the tight fastening force that is desired.

Another problem with the conventional fastener has been that when a rivet in the fastened condition is to be unfastened by pushing the pin further into the rivet body, the pin is apt to come all the way out the other end of the rivet body and fall in among the other components of the device in which it is used. In this case, if the pin cannot be found it of course cannot be reused, but an even greater problem is that it may interfere with the operation of the device.

One of the reasons for these shortcomings of the conventional rivet is that since the leg member which is expanded by the insertion of the pin is formed to have a plurality of legs either by providing one or more cuts axially inward from the tip of the leg member or by a plurality of axial slits provided in the intermediate section of the leg member so that when the pin is inserted, all of the legs spread outward by the same amount.

SUMMARY OF THE INVENTION

The object of the present invention is to provide a plastic rivet which is free from the shortcomings of the conventional rivet described above.

The present invention attains this object by providing a plastic rivet consisting of a rivet body comprised of a flanged head and a leg member extending from the bottom of the head, the rivet body having an axial hole extending through its entire length, and a pin which when inserted into an axial through-hole of the rivet body expands the leg member. The rivet is characterized in that the leg member is formed to have a movable leg by providing two slits running axially inward from the tip of the leg member, and the movable leg is provided on its inner surface with a tooth-like protuberance. The shank of the pin is provided with two V-shaped recesses spaced in the axial direction of the pin to leave a tooth-like protuberance therebetween, and the tip of the tooth-like protuberance of the pin is provided with a notch, whereby when the pin is inserted into the axial through-hole of the rivet body only the movable leg is deflected outward. With this arrangement, it is possible to realize a large spreading of the leg member and a large engaging force between the rivet and the plates or the like that it is used to fasten, while at the same time making it possible to carry out the leg spreading operation with a small pushing force exerted on the pin.

Moreover, in accordance with another feature of the present invention, the axial through-hole of the rivet is formed of a large-diameter portion at the head end thereof followed by a small-diameter portion continuing on to the tip, a shoulder being formed at the boundary between the large- and small-diameter portions. The pin is provided with a head of such size that, when the pin is inserted into the axial through-hole for the purpose of spreading the leg member, the head can fit into the large-diameter portion but abuts with and is stopped by the shoulder so that the pin is prevented from falling out from the tip end of the rivet body. There is thus no possibility of the pin getting lost in the device.

BRIEF EXPLANATION OF THE DRAWINGS

The other objects and characteristic features of this invention will become apparent to those skilled in the art as the disclosure is made in the following description of a preferred embodiment as illustrated in the accompanying drawing in which:

FIG. 1 is a sectional view taken along the longitudinal center of an embodiment of a rivet according to this invention showing the pin partially inserted into the rivet body.

FIG. 2 is a cross-sectional view taken along line II—II in FIG. 1.

FIG. 3 is a sectional view taken along the longitudinal center of the same embodiment showing the rivet in the fully fastened state.

FIG. 4 is a cross-sectional view taken along line III—III in FIG. 3.

FIG. 5 is a sectional view taken along the longitudinal center of the same embodiment showing the rivet in the released state.

FIG. 6 is a sectional view taken along the longitudinal center of the rivet body.

FIG. 7 is a bottom view of the rivet body.

FIG. 8 is a sectional view taken along the longitudinal center of the pin.

FIG. 9 is a bottom view of the pin.

FIG. 10 is a partially broken away perspective view of the pin.

DESCRIPTION OF THE PREFERRED EMBODIMENT

In the longitudinal sectional view of a rivet according to this invention shown in FIG. 1, the rivet is shown to consist of a rivet body 1 and a pin 2. In FIG. 1 the rivet is illustrated in the state ready for use, with the pin 2 partially inserted into the rivet body 1. FIG. 2 is a cross-sectional view taken along line II—II of FIG. 1.

Both the rivet body 1 and the pin 2 are formed of plastic. The rivet body 1 has a flanged head 3 and a rod-shaped leg member 4 which extends perpendicularly from the undersurface of the head 3. The rivet body 1 has an axial through-hole 5 running its full length, i.e. from the upper surface of the head 3 to the tip of the leg member 4.

The portion of the through-hole 5 extending from the opening in the head 3 to an intermediate point in the leg member 4 is formed as a large-diameter portion 5'. At the end of the large-diameter portion 5' is a shoulder 6, beyond which the wall of the leg member becomes thick and the through-hole 5 assumes a generally semicircular shape as best shown in FIG. 7.

As shown in FIGS. 6 and 7, the leg member 4 provided with the through-hole 5 is further provided with two slits 7 running inward from the tip of the leg member 4 in the direction of the head 3. These slits 7 separate off a part of the leg member 4 so as to form a movable leg 8 which is able to swing resiliently about the thin-walled region at its proximal end.

Being formed by the two slits 7 provided in the part of the leg member 4 wherein the through-hole 5 is of approximately semicircular cross-section, the movable leg 8 is positioned as opposed to a thick-walled portion of the leg member 4, and at the middle portion on the inner surface of the movable leg 8 there is formed a tooth-like protuberance 9, the inclined edges of which are aligned with the longitudinal direction of the leg member 4.

As will be explained in more detail later, this protuberance 9 is for opening the leg 8 by engagement with a protuberance on the pin 2. The protuberance 9 is rounded at its top for better sliding engagement and is formed to such height that in its normal (unflexed) state its top reaches the inner surface of the thick-walled portion.

The pin 2 is formed of a shank portion having a head 10 at its one end. The shank portion is given a semicircular cross section matched to the configuration of the through-hole 5 formed in the rivet body 1 and is provided at the center of its flat surface with a slide-groove 11 that runs from its tip to near the head 10 and has a width sufficient for admitting the top of the protuberance 9. In the longitudinal direction of the slide-groove 11 are formed first and second V-shaped recesses 12 and 13, so spaced as to leave a protuberance 14 standing between them. The top of the protuberance 14 is provided with a notch 15 for engagement with the top of the protuberance 9.

On the outer arcuate wall of the shank portion at positions removed from the upper opening of the slide-groove 11 are provided a pair of projections 16 for engagement with the slits 7 of the rivet body 1.

The pin 2 is made longer than the rivet body 1 and the head 10 is given a diameter such that it can enter freely into the large-diameter portion 5' of the through-hole 5.

The rivet of the foregoing structure is fabricated by first separately forming the rivet body 1 and the pin 2 for insertion therein. The shank of the pin 2 is then inserted tip first into the through-hole 5 of the rivet body 1 from the opening in the head. At this time, the shank is inserted so as to engage the protuberance 9 of the movable leg 8 with the slide-groove 11, and the projections 16 provided on the outer surface of the shank portion with the slits 7, whereafter the pin is pushed inward causing the floor of the slide-groove 11 to push the protuberance 9 outward until the first recess 12 formed in the pin 2 reaches the position of the protuberance 9 thus allowing the protuberance 9 to fall into engagement with the recess 12. This completes the fabrication of the rivet. The rivet in the completed state is shown in FIGS. 1 and 2.

Next, the manner in which the rivet is used to fasten together two plates $P_1$ and $P_2$ will be explained with respect to FIG. 5. The plates $P_1$ and $P_2$ are first provided with holes $h_1$ and $h_2$ large enough to admit the leg member 4 of the rivet body 1. The two holes are brought into registration and the leg member 4 of the rivet body 1, which at this time is combined with the pin 2, is inserted into the two holes from the side of the hole $h_1$ until the undersurface of the head 3 strikes against the outer surface of the plate $P_1$. Next, the head 10 of the pin 2, which at this time projects outward from the outer surface of the head 3, is driven in with a mallet or the like to the point where the surfaces of the two heads 10 and 3 are flush with each other. As the shank portion of the pin 2 is driven in, the protuberance 14 advancing therewith rides on the protuberance 9, causing the movable leg 8 to bend outward around the point where it exits from the plate $P_2$ until, finally, the top of the protuberance 14 engages with the notch 15 in the top of the protuberance 9. The plates $P_1$ and $P_2$ are thus caught between the head 3 and the outwardly bent protuberance 9.

FIGS. 3 and 4 show this fastened state. It will be noted that the movable leg 8 is pushed outward by the protuberance 14 by an amount nearly equal to the height of the protuberance 14 so that the degree of opening is large, meaning that it is possible to realize a very great expansion in the effective outer diameter of the leg member 4.

If when the rivet is in this fastened state further pressure is applied to the head 10 of the pin 2 so as to cause the shank portion to advance further, the head 10 will progress into the large-diameter portion 5', causing the protuberance 9 to come free of the protuberance 14 and fall into the second recess 13. The protuberance 9 comes into full engagement with the second recess 13 at the time the bottom surface of the head 10 strikes against the shoulder 6. When this state is reached, the movable leg 8 is fully returned from its deflected state so that the effective outer diameter of the leg member 4 is restored to its normal size and the leg member 4 can be extracted from the holes $h_1$ and $h_2$.

This unfastened state of the rivet is illustrated in FIG. 5, from which it will be clear that when the pin 2 is pushed in to unfasten the rivet, there is no danger of its falling out the other end since the head 10 thereof is stopped by abutment with the shoulder 6. As a result, the rivet can be extracted from the plate holes with the pin 2 held securely therein.

As the rivet according to the present invention has the structure described in the foregoing, the pin is prevented from falling out of the rivet body in the normal state by the engagement of the protuberance 9 of the movable leg 8 with the first recess 12 of the pin 2. The rivet is thus advantageous in that it can be handled as a single unit without danger of the pin and the rivet body becoming separated. On the other hand, it is also extremely advantageous in use since when it is to be used for fastening, the leg member 4 can be expanded merely by driving the pin 2 inward until its head 10 comes flush with the head 3 of the rivet body 1, and also since when it is to be extracted after once being fastened, it is only necessary to push the pin 2 further into the through-hole 5 to again reduce the effective diameter of the leg member and make it possible to pull out the rivet.

Moreover, in the rivet of the present invention the expansion of the leg member 4 by the insertion of the pin 2 does not involve the expansion of the leg member as a whole but only the deflection of the movable leg 8 formed separately from the remainder of the leg member by the provision of the slits 7. Therefore, as the expansion of the leg member can be easily realized by bending the movable leg about its proximal end, it is possible to realize a large expansion of the leg member with only a small pushing force. The large degree of spreading of the leg member obtainable in accordance with the present invention is highly advantageous not only in that it assures secure fastening but also in that it makes it easy to minimize the amount of processing error in the formation of the through-hole provided in the leg member.

Also, since the head 10 of the pin 2 strikes against the shoulder 6 when the pin 2 is pushed inward for unfastening the rivet, the pin 2 is prevented from falling out the far end of the leg member 4, meaning that since the pin is never lost it can always be reused and will never be a cause of malfunctioning of the device in which the rivet is used.

Moreover, in accordance with the present invention, when the pin 2 is inserted into the rivet body 1, the protuberance 9 of the movable leg 8 is engaged with the slide-groove 11 and, further, the projections 16 provided on the outer surface of the pin 2 are engaged with the slits 7 provided on opposite sides of the movable leg 8. Thus, as the pin 2 is always guided within the slide-groove 11 in the prescribed orientation, the protuberance 9 is always reliably guided to the top of the protuberance 14 to engage with the notch 15 and push the movable leg 8 outward to its open position. For the same reason, the protuberance is also reliably guided into the recess 13 at the time the rivet is unfastened. As seen from this, the present invention provides a very reliable rivet that invariably operates with precision so that there is no danger of a component or the like being insecurely fastened because the insertion of the pin into the rivet body failed to provide insufficient expansion of the leg member.

What is claimed is:

1. A plastic rivet consisting of rivet body comprised of a flanged head and a leg member extending from the bottom of the head and having a tip remote from said head, the rivet body having an axial hole extending through its entire length, and a rotationally asymmetric pin which when inserted into the through-hole of the rivet body expands the leg member, characterized in that the through-hole has a large-diameter portion extending from the head of the rivet body to an intermediate portion of the leg member, a shoulder being formed between the large-diameter portion and the remainder of the through-hole, the leg member being formed to have a single movable leg by providing two off-center slits opening axially outwardly at said tip and running axially inward from the tip of the leg member, said slits communicating with the through-hole, the movable leg being provided on its inner surface with a tooth-like protuberance extending transversely substantially completely across said through-hole, the pin having a shank portion having a transverse dimension and being provided on one end with a head capable of entering the large-diameter portion of the through-hole, the shank of the pin being provided with two V-shaped recesses spaced in the axial direction of the pin and each having a depth substantially equal to said transverse dimension of said pin to leave a tooth-like protuberance therebetween having a height substantially at least as great as said transverse dimension of said pin, and the tip of the tooth-like protuberance of the pin being provided with a shallow notch, whereby when the pin is inserted into the through-hole from the head end of the rivet body to the point that the protuberance on the movable leg engages with the first recess, the head of the pin is at a position outward from the outer surface of the head of the rivet body, when the head of the pin is pressed further inward to bring its outer surface flush with the outer surface of the head of the rivet body, the notch provided on the protuberance on the shank coming into engagement with the top of the protuberance on the movable leg and causing the movable leg to be deflected outwardly to increase the effective diameter of the leg member, and when the head of the pin is pressed inward still further to cause it to enter the large-diameter portion to the point where it strikes against the shoulder, the protuberance on the movable leg engaging with the second recess allowing the movable leg to close and reduce the effective diameter of the leg member.

2. A plastic rivet as set forth in claim 1 and further including projections on said pin extending into said slits for rotationally orienting said pin relative to said rivet body.

3. A plastic rivet as set forth in claim 1 wherein said V-shaped recesses open outwardly substantially only on one side of said pin, said recesses being closed on two sides by substantially parallel side walls.

4. A plastic rivet as set forth in claim 3 and further including projections on said pin extending into said slits for rotationally orienting said pin relative to said rivet body.

* * * * *